Patented Oct. 6, 1931

1,826,008

UNITED STATES PATENT OFFICE

HENRY J. LORANG, OF ST. LOUIS, MISSOURI, ASSIGNOR OF ONE-HALF TO FRANK J. KUNA, OF ST. LOUIS, MISSOURI

PROCESS OF AND COMPOUND FOR HARDENING THE SURFACE OF MILD STEELS

No Drawing. Application filed May 27, 1929. Serial No. 366,529.

This invention relates to a novel process for hardening the surface of cold rolled and other mild steels, and to a novel compound for use in practicing said process.

According to my invention, the surface of the steel is carburized to a desired depth by a compound consisting of the following named ingredients used in the proportions by weight stated, viz:

Lamp black, $3\frac{1}{8}\%$; ferrochrome, $3\frac{1}{8}\%$; ferromanganese, $1\frac{1}{4}\%$; charcoal, $92\frac{1}{2}\%$.

In practice, the charcoal is granulated into particles having approximately the size of peas. The ferromanganese and ferrochrome are preferably ground to a fineness enabling them to pass through a twenty-mesh screen and, together with the lamp black, mixed with the charcoal. A layer of the compound, say about two inches in depth, is then placed in a container, one or more of the steel articles to be hardened laid on the compound, and another layer of the compound placed in the container to cover the steel articles. The container is then closed and sealed, and placed in a furnace and heated until it reaches a temperature of from 1560° to 1575° F., the quenching temperature, and the work is then withdrawn and quenched.

The time of treatment varies with the thickness of the metal being treated. For example, for a steel bar three-fourths of an inch in diameter, the treatment would require about two hours and the penetration would be about one-sixteenth of an inch for average treatments. If a greater penetration within the same time limit is desired, this can be secured by increasing the amount of ferrochrome up to about four times the amount named, and the amounts of ferromanganese and lamp black up to about double the amount named. With this maximum degree of treatment, a penetration of one-eighth of an inch or better can be obtained within the same time period.

So far as my knowledge extends, the hardening or carburizing process as practiced with any of the hardening compounds now on the market requires from six to eight hours. It will thus be seen that the use of the compound described above enables me to secure very great economy in the time factor.

I have found that the above described compound is peculiarly advantageous and economical in the respect of permitting repeated use thereof before discarding it for a fresh compound. For example, with four pieces of steel bar aggregating three pounds in weight and using one pound of the compound, I have been enabled to use the same compound in three different runs without adding at all to the compound, and in the last heat there was just the same degree of penetration and hardness as with the first heat. Ordinarily, however, owing to some loss in bulk of the compound, particularly of the charcoal, it is desirable to add a sufficient quantity of fresh material to make up for the loss in volume of the material due to loss in the heating.

An analysis of the steel used in testing my compound as recited above showed the carbon averaging from .15 to .25; manganese, from .30 to .60; phosphorus, a maximum of .045; and sulphur, a maximum of .05. The steel used was what is known as carbon or cold rolled steel.

Even with what is known as "screw stock" i. e. steel containing a much higher percentage of sulphur than the ordinary carbon steels, I have been enabled with the same treatment and time of treatment as above, to secure substantially the same degree of hardness and penetration as when using the process and compound in hardening carbon steel.

It will be observed that I use a relatively small amount of ferromanganese as compared with the amount of ferrochrome. The ferrochrome, if used alone, will require a much longer time for the treatment. The addition of the ferramanganese expedites the treatment and the amount is so proportioned that the steel will not be rendered brittle. The use of such a reduced amount of ferromanganese also prevents pitting of the surface of the article being hardened by reason of silicon contained in the ferromangese being fused on the surface of the article.

For convenience in packing and using my compound, I prefer to tumble it in five-pound lots and place the same in paper bags, which permits of it being readily emptied into the containers as desired.

I claim:

1. The herein described compound for use in hardening the surface of cold rolled and other mild steels, consisting of the following ingredients used in the proportions by weight named, to wit: lamp black, 3⅛%; ferrochrome, 3⅛%; ferromanganese, 1¼%; charcoal, 92½%.

2. The process of hardening the surface of cold rolled and other mild steels, consisting of embedding the article to be hardened in a compound composed of the following named ingredients used in the proportions by weight stated, to wit: lamp black, 3⅛%; ferrochrome, 3⅛%; ferromanganese, 1¼%; and charcoal, 92½%, enclosing the embedded article in a container, and subjecting the same in a furnace to a temperature of from 1560° to 1575° F. for a period of approximately two hours and then withdrawing and quenching the article.

In testimony whereof, I have hereunto set my hand.

HENRY J. LORANG.